UNITED STATES PATENT OFFICE 2,051,266

CATALYTIC OXIDATION OF POLYHYDRIC ALCOHOLS

Sumner H. McAllister and Martin de Simo, Berkeley, Calif., assignors to Shell Development Company, San Francisco, Calif., a corporation of Delaware No Drawing. Application March 23, 1935, Serial No. 12,735

15 Claims. (Cl. 260—134)

This invention relates to the catalytic oxidation of polyhydric alcohols and more particularly to the reaction of alcohols containing a plurality of primary and/or secondary carbinol groups with oxygen in the presence of an oxidizing catalyst.

An essential feature of our process comprises effecting the oxidation of a polyhydric alcohol which contains no tertiary carbinol groups, by causing it to react with oxygen, which may be present in a substantially pure form or in admixture with diluent gases such as nitrogen, etc., as air, or the oxygen may be liberated under the conditions of operation from substances containing oxygen in a combined form. An important advantage of the process of our invention is the uniformity of the oxidation which it achieves, that is, it permits of the conversion of the primary carbinol groups to aldehyde groups, and of the secondary carbinol groups to ketonic groups, without substantial formation of higher oxidation products such as acids, or rupture of the molecule.

The polyhydric alcohols which may be used in our process may be either primary polyhydric alcohols (i. e. polyhydric alcohols containing only primary carbinol groups) or secondary polyhydric alcohols (polyhydric alcohols containing only secondary carbinol groups) or mixed primary-secondary polyhydric alcohols containing both primary and secondary carbinol groups. Polyhydric alcohols containing tertiary carbinol groups are preferably not used, as oxidation of such groups leads to rupture of the alcohol molecule. The polyhydric alcohol or alcohols used may be aliphatic, carbocyclic or heterocyclic and may contain alkoxy, aralkyl, aryloxy and/or aralkoxy groups which may or may not be further substituted and may or may not contain unsaturated bonds. As suitable starting material the chemical individuals may be used, or mixtures thereof, or they may be applied as crude mixtures containing diluent materials which are inert under the conditions of our process.

Typical polyhydric alcohols which may be oxidized by our process are: (1) aliphatic polyhydric alcohols, for example, ethylene glycol HO—CH₂—CH₂—OH, α propylene glycol,

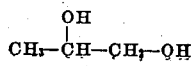

and homologues such as α butylene glycol

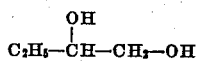

α amylene glycol

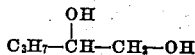

α isoamylene glycol

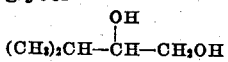

and the like, or their isomers such as 2,3 butylene glycol

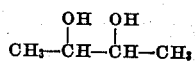

2,3 amylene glycol

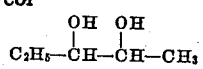

and the like. Other contemplated aliphatic polyhydric alcohols are, trimethylene glycol HO—CH₂—CH₂—CH₂—OH, β butylene glycol

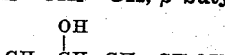

and homologues such as ethyl trimethylene glycol

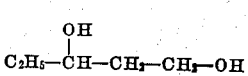

etc., and their isomers, as sym. dimethyl trimethylene glycol

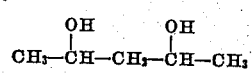

2,3 dimethyl trimethylene glycol

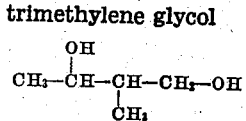

penta-glycol

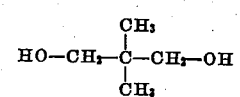

and the like, as well as tetramethylene glycol, HO—CH₂—CH₂—CH₂—CH₂—OH, and homologues. The higher polyhydric aliphatic alcohols are also included in this group, for example, glycerine

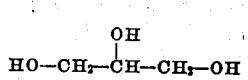

erythritol

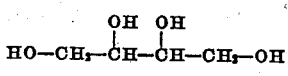

and homologues and analogues, such as 1,2,3 butyl glycerol

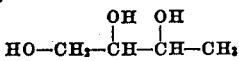

1,2,3 and/or 2,3,4 pentanetriol

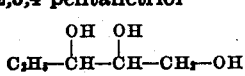

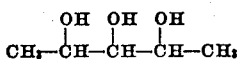

and the like. (2) polyhydric aralkyl alcohols, of which typical examples are, styrolene alcohol

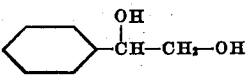

sym. phenyl-methyl glycol

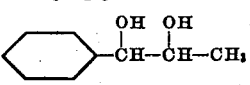

stycerine

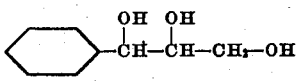

1,2-phthalyl alcohol

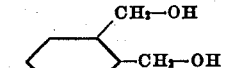

1,4 xylylene alcohol

pseudo cumenyl glycol

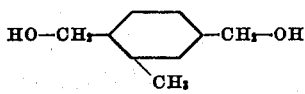

and homologues and analogues. (3) polyhydric hydroaromatic alcohols, such as trans-cyclohexane-1,2 diol

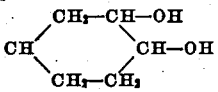

penta-methylene glycol

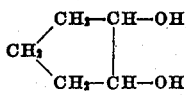

and the like. The cyclic nuclei may be heterocyclic as well as carbocyclic.

We have discovered that when primary and/or secondary polyhydric alcohols are caused to react with oxygen in the presence of a suitable oxidizing catalyst, preferably copper or an alloy or oxides thereof, oxidation of the carbinol groups is effected very uniformly, undesirable side reactions are repressed and good yields of polyketones and/or ketone aldehydes and/or polyaldehydic compounds may be obtained.

The term "oxidation" as used in this specification and the accompanying claims is to be understood as distinguishing our process from dehydrogenation processes which comprise splitting hydrogen atoms from a hydrogen-containing compound whereby molecular hydrogen is obtained as a reaction product. In an oxidation process, as herein defined, the polyhydric alcohol reacts with oxygen forming water and a carbonyl group. The chief product of our process is thus usually a polycarbonylic compound, although under certain conditions all the carbinol groups may not be oxidized and ketone and/or aldehyde alcohols may be formed to a greater or lesser extent. In any case, however, the reaction is carried out under conditions at which rupture of the polyhydric alcohol molecule and/or the formation of higher oxidation products, such as acids, is minimized.

Our invention is capable of many widely different modifications. The oxidation may, for example, be effected in either the liquid, liquid-vapor or the vapor phase. One convenient method of carrying out our invention is as follows: The polyhydric alcohol to be oxidized is distilled in a stream of oxygen, or free oxygen containing gas, into a column packed with the desired catalyst. At the top of the column a reflux may be maintained to return unchanged polyhydric alcohol and/or incompletely oxidized products thereof to the reaction zone while allowing the more volatile oxidation product to escape and be separately collected. By controlling the temperature of condensation in the reflux column the degree of oxidation may be controlled, and since the highly oxidized products, e. g. acids, have higher boiling points than the desired ketonic and/or aldehydic products they may, if any are formed, be separated in the same operation. By this refluxing procedure the oxidation is effected at, or below, the boiling point of the ketol. As a result the reaction, in certain cases, may be relatively slow and comparatively long times of contact may be required for its completion. This may in some cases lead to some, although usually small, decomposition and rupture of carbon to carbon linkages especially in the acid oxidation products condensed with the reflux.

An alternative method of procedure in applying our invention comprises effecting the polyhydric alcohol oxidation entirely in the vapor phase. For example, polyhydric alcohol vapors may be passed in admixture with a definite ratio of air and/or oxygen over an appropriate catalyst heated to the reaction temperature. The exit vapors may be passed into a fractionating column wherein the desired oxidized product is separated and the unreacted and/or incompletely reacted polyhydric alcohol recycled through the oxidation zone. The water formed as a by-product of the oxidation reaction may be separated from the product and/or unreacted and/or incompletely reacted polyhydric alcohol by any suitable method. In many instances the reutilized or originally employed polyhydric alcohol need not be free of water, however, as the presence of water vapor, in non-excessive amounts does not interfere with the reaction and may, in certain cases, be advantageous in lowering the boiling point of the polyhydric alcohol and/or its oxidation products.

In purely vapor phase methods of operation higher temperatures may be used than in the previously described modification and consequently shorter times of contact are permissible. The practical upper limit of reaction temperature is set, however, by the stability, especially toward pyrolytic decomposition, of the polyhydric alcohol being oxidized as well as of the oxidation product sought, at the existing pressure. Where the desired product is of an aldehydic nature its tendency toward polymerization may be a controlling factor in determining the temperature of treatment. The use of temperatures below about 200° C. has been found, in the majority of cases, to give relatively low rates of oxidation.

We preferably employ therefore, in vapor phase operations, temperatures between about 200° C. and about 500° C. in order that the time of contact may not be unduly long.

The reaction temperature may be controlled in any convenient manner. As the reaction in our process is predominantly exothermic, means for absorbing heat are usually required. Diluent gases admixed with the oxygen used may serve this purpose or an inert substance of suitable constant boiling point may be introduced or the reacting zone may be surrounded by a selected constant boiling substance which on vaporization consumes the heat liberated by the exothermic reaction and thereby maintains a substantially constant temperature in the reaction zone. By a proper method of distributing the gas mixture comprising polyhydric alcohol and oxygen throughout the catalyst bed the whole may be kept at a uniform temperature without application of external heat, thus effecting a considerable economy of operation. Furthermore, suitable heat exchangers may be internally or externally applied whereby the polyhydric alcohol being treated may be preheated and/or partly or completely vaporized by the heat of the reaction. If desired, the exothermic oxidation reaction may be conducted in conjunction with an endothermic reaction such as a dehydrogenation in such a manner that the heat liberated by the former is supplied to the latter, thus effecting further thermal economies.

Either superatmospheric, atmospheric or subatmospheric pressure may be used. Superatmospheric pressures favor the oxidation reaction but in some cases, as when operating with polyhydric alcohols which might themselves decompose or yield readily decomposable or polymerizable oxidation products at, or near, their normal boiling point, it may be desirable to employ subatmospheric pressures. An intermittent, batch or continuous mode of operation may be employed.

In any method of operation the ratio of free oxygen to polyhydric alcohol present in the reaction zone has a marked effect on the course of the reaction. Excess oxygen tends to increase the rate of conversion of the polyhydric alcohol, but also promotes the formation of highly oxidized products such as acids. Where less highly oxidized products such as polyketonic and/or ployaldehydic and/or mixed ketonic-aldehydic compounds are desired, it is preferable to carry out our invention with not more than about one mol of available oxygen per two carbinol groups present in the starting material.

The catalyst chosen for carrying out the reaction also markedly influences the results obtained. Among the suitable catalysts which may be employed in the solid state, the following may be mentioned as examples: copper, brass, copper oxide, silver, silver-zinc and silver-arsenic alloys, gold, gold-silver alloy, cobalt, cobalt oxide, nickel, the nickel oxides, vanadium, vanadyl sulfate, silver vanadate, chromium, chromium oxide, manganous oxide, zinc, zinc oxide, zinc sulfide, aluminum, cadmium, tin, stannous oxide, tungsten, etc. Particularly suitable are the heavy metals of the third period (i. e. the fourth and fifth series) of the periodic table such as titanium, vanadium, chromium, manganese, iron, cobalt, nickel, copper and zinc and compounds and mixtures thereof. The most desirable catalyst in any case, is one which possesses a moderate initial activity and is substantially devoid of the tendency to induce undesirable side reactions such as dehydration, condensation, polymerization, and the like, and possesses a freedom from deterioration as a result of sintering or poisoning. We have found the members of the copper family and especially, copper, copper oxide and silver, to be particularly suitable catalysts for our process. These catalysts are relatively inexpensive, are easily prepared and reactivated and are not readily poisoned by traces of halogen or sulfur compounds that may be present in one of the reactants.

The particular catalyst selected may be prepared in an active form in a variety of ways. For example, active metal catalysts may be prepared by either "dry" or "oil" reduction of oxides, hydroxides, carbonates, nitrates or organic acid salts such as formates, acetates and like compounds of the metal with hydrogen at a suitable temperature. The catalyst may be used alone or in admixture with other catalytic metals or compounds or with inert supports or carriers. Due to the exothermic nature of the reaction involved in our process, it is sometimes inadvisable to employ catalysts or carriers of low heat conductivity as the control of the temperature may be rendered difficult thereby. In the majority of cases we prefer, therefore, to use catalysts which are of a more or less compact metallic nature, such as metal wire screen, turnings, granules, nails and the like. The metallic surfaces may be activated, for example, by successive oxidation and reduction. A similar procedure may be used to restore the catalytic activity which is normally decreased with use. An alternative method of reactivation which has been found particularly useful with our preferred group of catalysts, the members of the copper family, comprises amalgamating the catalytic surface and supplying heat to drive off the combined mercury, thus leaving an activated catalytic metal surface.

For the purpose of making our invention more clear, the following example of a specific application thereof to the preparation of diacetyl, is given for illustrative purposes only. It will be understood, however, that we are not to be limited thereto, as our invention is capable of many other embodiments and may be used to prepare a wide variety of other products.

2,3 butylene glycol is passed over an activated copper catalyst, prepared by reducing copper oxide wire with hydrogen at low temperatures, along with 85% of the theoretical amount of air. The temperature of the catalyst is maintained at 270–275° C. The products obtained are condensed in a suitable trap and the diacetyl separated by distillation. The composition of these liquid products is as follows: diacetyl 44.8%, dimethyl ketol 38.3%, unchanged glycol 6.3%, and decomposition products 10.6%. After separating out the diacetyl, the ketol and unchanged glycol may be returned to the reactor along with fresh glycol and again oxidized. The relative yields of ketol and diacetyl depend upon the conditions of operation. Decreasing the amount of air used lowers the conversion and increases the ratio of ketol to diacetyl in the product.

Other typical products which may be produced by procedures similar to the above are pyroracemic aldehyde in very good yield, including polymer, from $\alpha$ propylene glycol, and glyoxal from ethylene glycol, the yield in this case being somewhat lower.

A wide variety of valuable products may thus be produced by our method with great economy of reagents, equipment and labor. The diketones are especially useful products, diacetyl, for example, being widely applied as a carrier of the aroma of butter, vinegar, coffee, honey and the like; while other diketones, as well, serve as important intermediates in the preparation of valuable cyclic compounds and other syntheses, and as solvents, particularly for selective extraction operations, and the like. The polyaldehydes and ketonic aldehydes produced by our process are valuable starting materials for the preparation of synthetic resins and plastics, by condensation with any of the well-known agents such as aldehydes, ketones, phenols, amines, etc.

Our process for the preparation of these products offers many advantages over previous methods particularly by providing controlled, selective oxidation at the carbinol groups which eliminates undesirable oxidation at other parts of the molecule, reduces excessive oxidation of one carbinol group at the expense of another, and gives economical yields.

While we have in the foregoing described in some detail the preferred embodiment of our invention and some variants thereof, it will be understood that this is only for the purpose of making the invention more clear and that the invention is not to be regarded as limited to the details of operation described, nor is it dependent upon the soundness or accuracy of the theories advanced as to the advantageous results attained. On the other hand, the invention is to be regarded as limited only by the terms of the accompanying claims in which it is our intention to claim all novelty inherent therein as broadly as is possible in view of the prior art.

We claim as our invention:

1. A process for the oxidation of a polyhydric alcohol of the class which consists of primary, secondary and mixed primary-secondary polyhydric alcohols to a polycarbonylic compound of the same number of carbon and oxygen atoms which comprises reacting said polyhydric alcohol with not more than about one mol of available oxygen per two carbinol groups in the presence of a solid oxidizing catalyst, at a temperature and for a time at which substantial conversion to said polycarbonylic compound is effected.

2. A process for the oxidation of a polyhydric alcohol containing no tertiary carbinol groups to a compound of the same number of carbon and oxygen atoms containing a carbonyl group in place of each of the carbinol groups which comprises reacting said polyhydric alcohol with not more than about one mol of available oxygen per two carbinol groups in the presence of a solid oxidizing catalyst, at a temperature and for a time at which substantial conversion to said polycarbonylic compound is effected.

3. A process for the oxidation of an alkyl polyhydric alcohol containing no tertiary carbinol groups to the corresponding polycarbonylic compound of the same number of oxygen atoms which comprises reacting said polyhydric alcohol with not more than about one mol of available oxygen per two carbinol groups in the presence of a solid oxidizing catalyst, at a temperature and for a time at which substantial conversion to said polycarbonylic compound is effected.

4. A process for the oxidation of a secondary polyhydric alcohol to the corresponding polycarbonylic compound of the same number of oxygen atoms which comprises reacting said polyhydric alcohol with oxygen in the presence of a solid oxidizing catalyst, at a temperature and for a time at which substantial conversion to said polycarbonylic compound is effected.

5. A process for the oxidation of a glycol, other than a tertiary glycol, to the corresponding dicarbonylic compound of the same number of oxygen atoms which comprises reacting said glycol with not more than about one mol of available oxygen per two carbinol groups in the presence of a solid oxidizing catalyst, at a temperature and for a time at which substantial conversion to said corresponding dicarbonylic compound takes place.

6. A process for the oxidation of a secondary glycol to a ketonic compound which comprises reacting said glycol with oxygen in the presence of a solid oxidizing catalyst at a temperature and for a time at which substantial conversion thereof to a ketonic compound takes place.

7. A process for the oxidation of a secondary glycol to a diketone which comprises reacting said glycol with oxygen in the presence of a solid oxidizing catalyst at a temperature and for a time at which substantial conversion thereof to a diketone takes place.

8. A process for the oxidation of a butylene glycol to a carbonylic compound of the same number of oxygen atoms which comprises reacting said glycol with oxygen in the presence of a solid oxidizing catalyst at a temperature and for a time at which substantial conversion of said polyhydric alcohol to said carbonylic compound is effected.

9. A process for the oxidation of 2,3 butylene glycol to a diacetyl which comprises reacting said glycol with oxygen in the presence of a solid oxidizing catalyst at a temperature and for a time at which substantial conversion to di-acetyl is effected.

10. A process for the oxidation of a polyhydric alcohol containing no tertiary carbinol groups to the correspoding carbonylic compound of the same number of oxygen atoms which comprises reacting said polyhydric alcohol with oxygen in the presence of a solid oxidizing catalyst containing at least one metal selected from the class consisting of the heavy metals of the third period of the periodic table and silver and gold at a temperature and for a time at which substantial conversion of said polyhydric alcohol to said carbonylic compound is effected.

11. A process for the oxidation of a polyhydric alcohol containing no tertiary carbinol groups to the corresponding carbonylic compound of the same number of oxygen atoms which comprises reacting said polyhydric alcohol with oxygen in the presence of a solid oxidizing catalyst containing essentially copper at a temperature and for a time at which substantial conversion of said polyhydric alcohol to said carbonylic compound is effected.

12. A process for the oxidation of a polyhydric alcohol containing no tertiary carbinol groups to the corresponding carbonylic compound of the same number of oxygen atoms which comprises reacting said polyhydric alcohol with oxygen in the presence of a solid oxidizing catalyst consisting of activated copper at a temperature and for a time at which substantial conversion of said polyhydric alcohol to said carbonylic compound is effected.

13. A process for the oxidation of a polyhydric alcohol containing no tertiary carbinol groups to the corresponding carbonylic compound of the same number of oxygen atoms which comprises reacting said polyhydric alcohol with oxygen in the presence of an oxidizing catalyst at a temperature between about 200° C. and about 500° C. and for a time at which substantial conversion of said polyhydric alcohol to said carbonylic compound is effected.

14. A process for the oxidation of a polyhydric alcohol containing no tertiary carbinol groups to the corresponding carbonylic compound of the same number of oxygen atoms which comprises reacting said polyhydric alcohol with oxygen in the presence of an oxidizing catalyst containing essentially an element of the copper family at a temperature between about 200° C. and about 500° C. and for a time at which substantial conversion of said polyhydric alcohol to said carbonylic compound is effected.

15. A process for the oxidation of a polyhydric alcohol containing no tertiary carbinol groups to the corresponding polycarbonylic compound of the same number of oxygen atoms which comprises reacting said polyhydric alcohol with oxygen in the presence of a solid oxidizing catalyst at about the boiling point of said alcohol under the conditions of the reaction and for a time at which substantial conversion of said polyhydric alcohol to said corresponding carbonylic compound is effected.

SUMNER H. McALLISTER.
MARTIN DE SIMO.